United States Patent [19]

Yamamoto et al.

[11] Patent Number: 4,471,085
[45] Date of Patent: Sep. 11, 1984

[54] DIAPHRAGM MATERIAL FOR LOUDSPEAKERS

[75] Inventors: Osamu Yamamoto, Hirakata; Takashi Takeda, Suita; Teruo Kobayashi, Osaka, all of Japan

[73] Assignee: Matsushita Electric Industrial Co., Ltd., Osaka, Japan

[21] Appl. No.: 471,456

[22] Filed: Mar. 2, 1983

[30] Foreign Application Priority Data

| Mar. 8, 1982 [JP] | Japan | 57-36036 |
| Jun. 17, 1982 [JP] | Japan | 57-104958 |
| Oct. 19, 1982 [JP] | Japan | 57-183905 |
| Nov. 10, 1982 [JP] | Japan | 57-196976 |
| Dec. 13, 1982 [JP] | Japan | 57-218618 |

[51] Int. Cl.³ ............................ C08K 3/34; C08K 3/04
[52] U.S. Cl. .................................. 524/449; 524/528; 181/157
[58] Field of Search ............... 524/579, 528, 449, 451, 524/495, 496

[56] References Cited

U.S. PATENT DOCUMENTS

| 4,166,057 | 8/1979 | Takemori | 524/528 |
| 4,328,146 | 5/1982 | Andy | 524/579 |
| 4,343,376 | 8/1982 | Tsukagoshi et al. | 524/496 |

FOREIGN PATENT DOCUMENTS

| 54-39451 | 3/1979 | Japan | 524/449 |
| 56-4643 | 1/1981 | Japan | 524/579 |
| 2072694 | 10/1981 | United Kingdom | 524/496 |

*Primary Examiner*—Lewis T. Jacobs
*Attorney, Agent, or Firm*—Wenderoth, Lind & Ponack

[57] ABSTRACT

A diaphragm material for use in making loudspeakers comprising a base material of olefin resin and a reinforcement in the form of flaky material. The base material is 4-methylpentene polymer with or without the addition of another olefin resin. The flaky material is one or a mixture of flaky graphite, mica and talc.

3 Claims, 7 Drawing Figures

F-characteristic of 12cm Diameter Loudspeaker

DIAPHRAGM MATERIAL FOR LOUDSPEAKERS

This invention generally relates to a diaphragm material for loudspeakers and, more particularly, to a composite diaphragm material comprising, as a base material, a 4-methylpentene polymer, which has the lowest density of all of the polymer resins, compounded with flaky material used as a reinforcement. Since the diaphragm material according to this invention is of a kind having a low density, a high modulus of elasticity and a high internal loss, the loudspeaker can have a wide range of reproduction frequency and high efficiency and can exhibit a low distortion and a flat frequency characteristic in a high frequency region. Moreover, since the base material is a thermoplastic resin, the diaphragm material can be molded by thermal molding, and has excellent reliability in water resistance and weathering resistance.

Hitherto, a paper cone has been used as a diaphragm material for a loudspeaker because paper has a lower density, an appropriate modulus of elasticity and an appropriate internal loss. However, since the paper cone has no capability of being molded by thermal molding, it is necessary to form individual sheets of paper into the conical shape one at a time, thus complicating the manufacturing procedure to such an extent as to result in production of paper cones of varying quality. In addition thereto, the paper cone is inferior with respect to water resistance, humidity resistance and weathering resistance.

Although the use of a metallic material, for example, aluminum, beryllium or the like, and a macromolecular material, for example, polypropylene, polyethylene or the like in place of the paper is a recent trend, the metallic material is high in modulus of elasticity, but extremely low in internal loss and, therefore, tends to result in such a frequency characteristic as to exhibit a sharp peak in a high frequency region. On the other hand, the macromolecular material is excellent in that it has a high internal loss and high resistances to water, humidity and weather, but is disadvantageous because of a low modulus of elasticity and, therefore, a low specific modulus (E/p) and low flexural rigidity (EI).

Accordingly, this invention has for its essential object to provide an improved diaphragm material for loudspeakers, wherein improvement is made in the low modulus of elasticity and the low rigidity both inherent in the macromolecular material, and which is therefore effective to exhibit a wide range of reproduction frequency, harmonic distortion and increased resistance to input power.

According to this invention, a diaphragm material for loudspeakers is prepared by compounding a base material which contains, as a principal component thereof, 4-methylpentene polymer of the following formula,

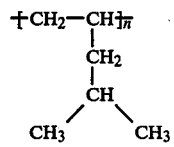

which is obtained by polymerizing 4-methylpentene-1 of the following formula,

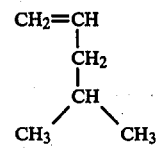

which is a dimer of propylene, with a reinforcement which is flaky material such as mica, a flaky graphite, talc or the like, or a combination thereof. The 4-methylpentene polymer itself has a density of 0.83 g/cm$^3$, which is the lowest density of all of the polymer resins, a high melting point within lthe range of 235° to 240° C., and a high internal loss. However, the polymer has an insufficient capability of being formed into a film, as well as an insufficient capability of being molded by thermal molding and, also, is disadvantageous in that the internal loss is dependent on temperature. It has, however, been found that these disadvantages inherent in the polymer can successfully be minimized, or substantially eliminated, by blending it with one or a mixture of the other olefin resins including, for example, polypropylene, polyethylene and polybutylene. Since the 4-methylpentene polymer is an olefin resin, the blending of the polymer with one or more resins other than an olefin resin results in separation and also incapability of being formed into a film.

According to this invention, the following advantages can be appreciated.

(1) Since the 4-metylpentene polymer, having the lowest density of all of the polymer resins, is used as the base material, improvement can be made to impart a high efficiency and a low harmonic distortion. Also, it is a material having high resistances to weather, water and humidity as well as a capability of being mass-produced with stabilized quality.

(2) By blending the base material, that is, the 4-methylpentene polymer with one or a mixture of the other olefin resins, the moldability and the temperature-dependent physical property can be improved.

(3) Since the reinforcement is employed in the form of a flaky material, the modulus of elasticity, the high flexural rigidity and the internal loss can be increased, a wide range of reproduction frequency can be expected, and the resistance to input power can be increased and the flatness in frequency characteristic can be achieved in a high frequency region. Moreover, not only can respective resistances to heat and weather be increased, but the temperature-dependent property can also be improved.

(4) When the reinforcement is employed in the form of a mixture of flaky graphite and mica, the specific modulus of elasticity can further be increased.

(5) When the reinforcement is employed in the form of a mixture of flaky graphite and talc, not only can the specific modulus of elasticity be increased, but also a thin film can be formed, while a thin film can not be formed with the use of another filler.

(6) The element formed from a 4-methylpentene polymer synthetic pulp is excellent in flexural rigidity and density, giving a high efficiency, a high resistance to input power and a low distortion.

These and other objects and features of this invention will become apparent from the following description taken in conjunction with illustrative examples with reference to the accompanying drawings, in which.

Hereinafter, this invention will be described in detail by way of examples which are not intended to limit the scope thereof, but are set forth only for the purpose of illustration thereof.

EXAMPLE 1

10 Vol% mica, sieved through a 325 mesh screen, was mixed with 60 vol% 4-methylpentene polymer (TPX manufactured and sold by Mitsui Petrochemical Industries, Ltd., of Japan) and 30 vol% polypropylene (manufactured and sold by Chisso Corp. of Japan) by the use of a twin-screw extruder to form a master pellet. The master pellet was then extruded by the use of an extruder into a composite sheet, 400 micrometers in thickness, which was in turn heated for about 1 minute by far infrared rays. When the sheet had softened, the sheet was vaccum-molded into a diaphragm for a 16 cm diameter loudspeaker. Physical properties of the sheet are set forth in the Table below, and it will readily be seen that the sheet according to this example is higher in specific modulus and flexural rigidity than a comparative sheet made of polypropylene, and can exhibit a wider range of reproduction frequency and a lower distortion than that of polypropylene.

Figure 1:
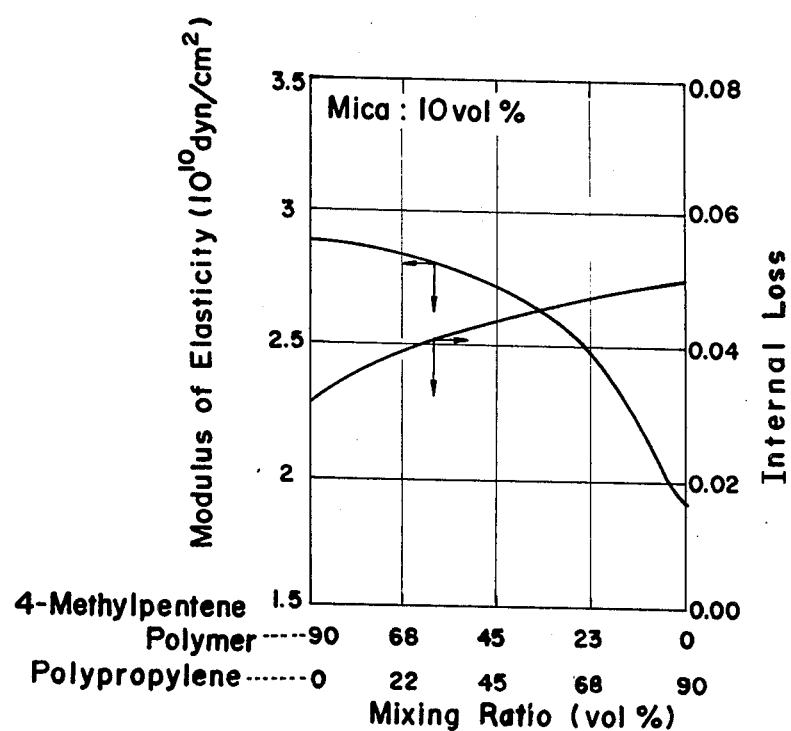
FIGS. 1 to 3 are graphs showing the change in physical property with change in mixing ratio of 4-methylpentene polymer and polypropylene.
Figure 2:
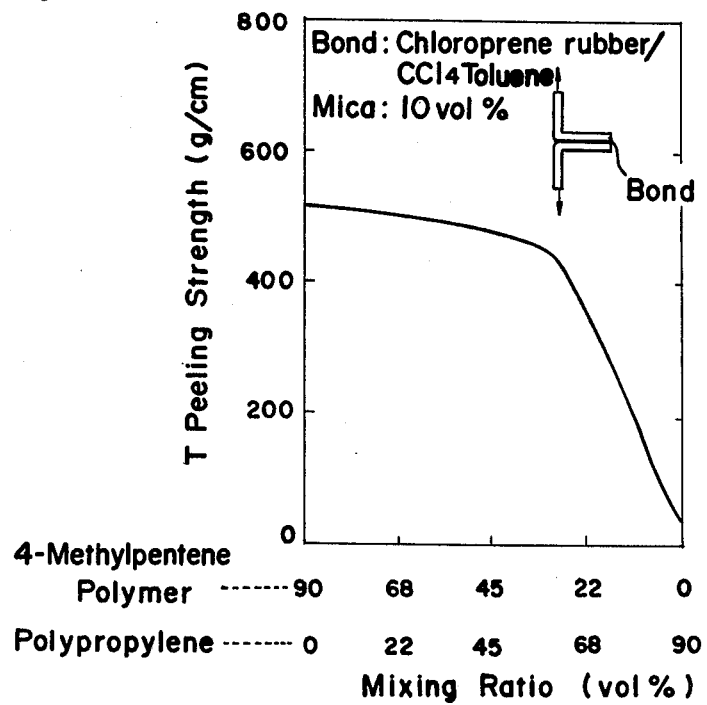
Figure 3:
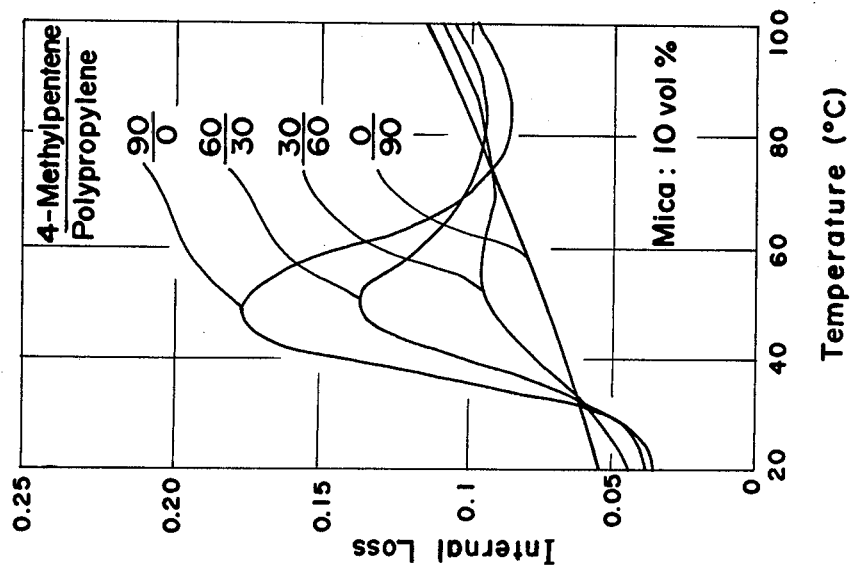

Change in physical property resulting from change in mixing ratio of the 4-methylpentene polymer and the polypropyrene relative to 10 vol% of the mica is shown in the respective graphs of FIGS. 1 to 3. It will readily be seen that, as the content of the polypropylene increases the sharp peak of the internal loss at the glass transition temperature diminishes while its absolute value increases and, therefore, the moldability is increased. On the other hand, the modulus of elasticity and bondability and decreased. Accordingly, the volume ratio of the 4-methylpentene polymer relative to the polypropylene is preferred to be ½ or more. This applies even where polyethylene or polybutylene is used in place of the polypropylene.

EXAMPLE 2

85 Vol% 4-methylpentene polymer (TPX), 10 vol% polybutylene and 5 vol% talc (sieved by the use of a 400 mesh screen) were mixed and formed into a sheet of 400 micrometers in thickness by the same method as in Example 1. The physical properties of this sheet are shown in the Table, and, both the internal loss and the bondability are found to have been increased.

EXAMPLE 3

Figure 4:
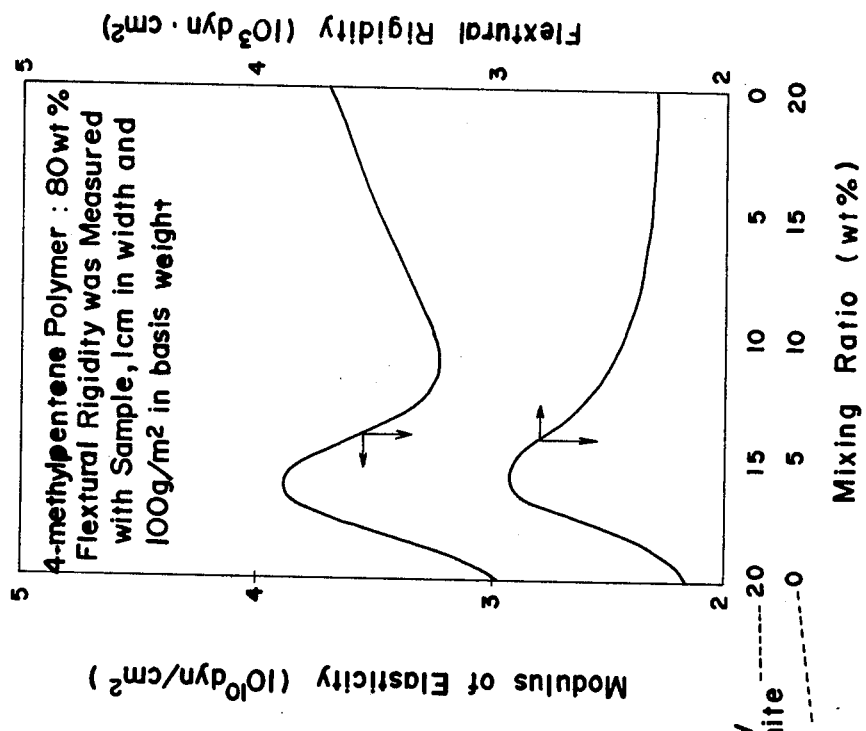
FIG. 4 is a graph showing the change in modulus of elasticity with change in mixing ratio of graphite and mica.

In the same method as in Example 1, but using 80 wt% 4-methylpentene polymer (TPX) as the base material and a mixture of 16 wt% flaky graphite, 10 micrometers in average diameter, and 4 wt% mica, 40 micrometers in average diameter as the reinforcement, a sheet of 150 micrometers in thickness was prepared. Change in modulus of elasticity resulting from change in mixing ratio of the graphite and the mica is shown in the graph of FIG. 4, and it will readily be seen that the use of the mica in an amount within the range of 10 to 30 wt% relative to the flaky graphite is effective.

As the base material, the use of the olefin resin has been found advantageous in the density and the flexural rigidity as compared with the other resins and, therefore, the high sound pressure level and the low harmonic distortion can be achieved.

Figure 5:
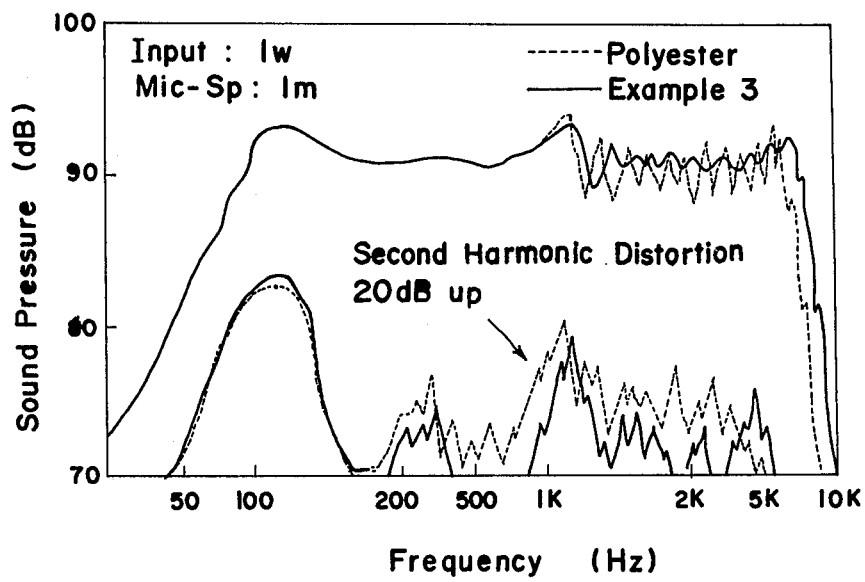
FIG. 5 is a graph showing the frequency characteristic of a 10 cm diameter loudspeaker manufactured with the use of the material of this invention.

The frequency characteristic of a diaphragm for a 10 cm loudspeaker, which was manufactured from the sheet in Example 3, is shown in the graph of FIG. 5, and it will readily be seen that the diaphragm exhibits a wide range of reproduction frequency with low harmonic distortion and that the use of the olefin resin is effective.

EXAMPLE 4

In the same method as in Example 1, but using a mixture of 50 wt% 4-methylpentene polymer (TPX) and 25 wt% polypropylene (F301J manufactured and sold by Ube Industries, Ltd., of Japan) and a mixture of 22 wt% flaky graphite (10 micrometers in average particle size) and 3 wt% of mica (40 micrometers in average particle size), a composite sheet of 160 micrometers in thickness was prepared.

Figure 6:
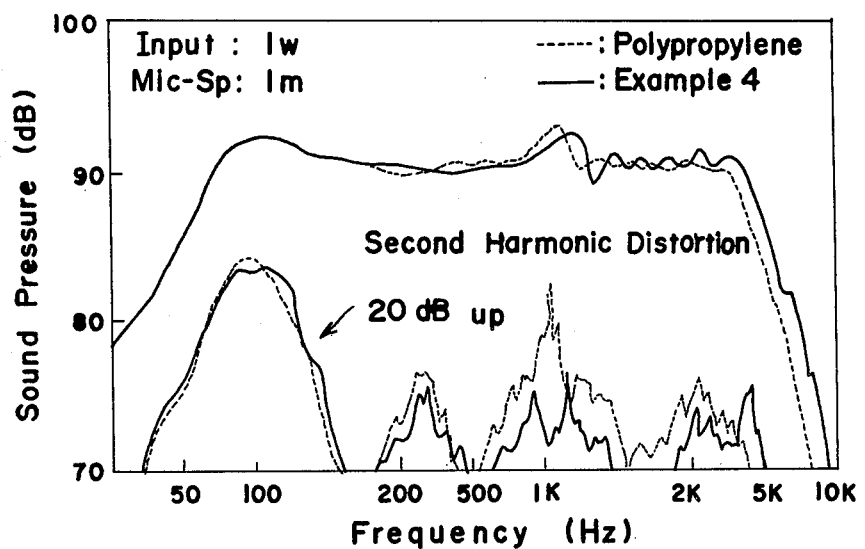
FIG. 6 is a graph showing the frequency characteristic of a 12 cm diameter loudspeaker manufactured with the use of the material of this invention.

The sheet so prepared was subsequently heated for about 7 to 8 seconds by bar infrared rays and, when it had been softened, was vacuum-molded. Physical properties of the sheet are shown in the Table, and it has been found that the sheet is excellent in modulus of elasticity, specific modulus and flexural rigidity as compared with the use of only one of the graphite and the mica as the reinforcement. The frequency characteristic of a 12 cm loudspeaker utilizing the sheet in this example is shown in the graph of FIG. 6, and it will readily be seen that the distortion is lower than that exhibited by a polypropylene diaphragm and that the range of reproduction frequency is increased.

EXAMPLE 5

In the same method as in Example 1, but using a mixture of 35 wt% 4-methylpentene polymer and 45 wt% polypropylene as the base material and a mixture of 5 wt% flaky graphite and 15 wt% mica as the reinforcement, a composite sheet of 100 micrometers in thickness was prepared.

The sheet so prepared was subsequently heated for several seconds while sandwiched between teflon-coated hot plates heated to 220° C. and, when it had been softened, was subjected to cold press working. Physical properties of the sheet so formed are shown in the Table. When a doom twitter, 40 mm in diameter, was assembled using this sheet, it was found that the distortion was low and the high frequency limit could be increased about 2 KHz, as compared with that assembled using a polypropylene sheet.

EXAMPLE 6

Figure 7:
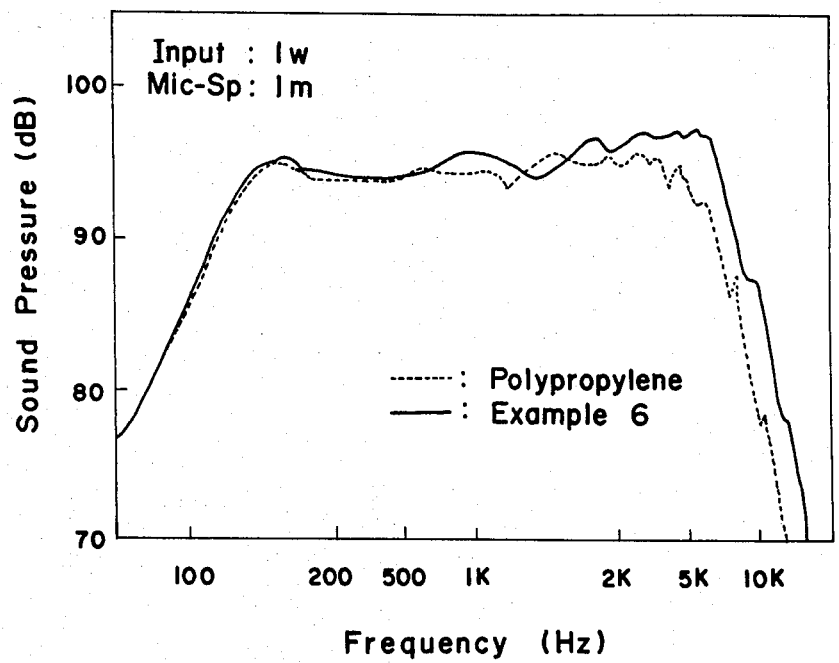
FIG. 7 is a graph showing the frequency characteristic of a 10 cm diameter loudspeaker manufactured with the use of the material of this invention.

In the same method as in Example 1, but using 80 wt% 4-methylpentene polymer (TPX) as the base material and a mixture of 10 wt% flaky graphite, 45 micrometers in average particle size, and 10 wt% talc, a few micrometers in average particle size, as the reinforcement, a composite sheet of 160 micrometers in thickness was prepared. The sheet so prepared was then heated by the use of a far infrared heater and was, when it had been softened, subjected to a cold press-molding to form a vibrating diaphragm for a 10 cm loudspeaker. The talc is high in modulus of elasticity, but has a disadvantage in that it has a high density. On the other hand, the graphite, although the modulus of elasticity is not so high, has an advantage in that the density is low and it acts to increase the internal loss. Therefore, by the utilization of both as the reinforcement, a composite film of high modulus of elasticity and high internal loss could be obtained. Physical properties of this film are shown in the Table and the frequency characteristic of a 10 cm loudspeaker is shown in the graph of FIG. 7. As compared with polypropylene, the range of the reproduction frequency is increased with the low harmonic distortion.

EXAMPLE 7

In the same method as in Example 1, but using a mixture of 50 wt% 4-methylpentene polymer (TPX) and 20 wt% polypropylene (manufactured and sold by Mitsui Petrochemical Industries, Ltd., Japan) as the base material and a mixture of 25 wt% flaky graphite and 5 wt% talc as the reinforcement, a film was prepared.

Physical properties of this film are shown in the Table, and it has been found that, by the use of the polypropylene blended with the polymer, the film forming property and the moldability of the film could be improved remarkably. The loudspeaker characteristic of the diaphragm made of this film was such that reproduction could be attained over a wide range of frequency.

EXAMPLE 8

4-methylpentene polymer (TPX) was dissolved in carbon tetrachloride and the resultant intermediate product was extruded into methanol to form spun fibers. The spun fibers were then passed through an aqueous solution of polyvinyl alcohol to impart a hydrophilic property thereto and were subsequently subjected to a beating process to fibrillate them, thereby to form a synthetic pulp. As a synthetic pulp of polyethylene, SWP (E-620) manufactured and sold by Mitsui Petrochemical Industries, Ltd., of Japan was used.

Using a mixture of 30 wt% synthetic pulp of 4-methylpentene polymer and 55 wt% synthetic pulp of polyethylene as the base material and 15 wt% mica (sieved by the use of a 325 mesh screen) as the reinforcement, a composite sheet having a basis weight of 100 g/m² was prepared by uniformly mixing the base material and the reinforcement together by the use of a beater and then paper-forming the mixture by the use of a paper-forming machine. The sheet so prepared was then heated for about 10 seconds by the use of a far infrared heater and was, when it had softened, subjected to cold press working to mold it into a diaphragm of predetermined shape. Physical properties of this sheet are shown in the Table, and it will readily be seen that it is especially excellent in flexural rigidity, and the use of it could enhance the resistance to input power and the low distortion.

TABLE

| | Density $(g/cm^3)$ | Modulus of Elasticity $(10^{10}\ dyn/cm^2)$ | Specific Modulus of Elasticity $(10^{10}\ cm^2/sec^2)$ | Flexural Rigidity $(10^3\ dyn\ cm^2)$ | Internal Loss |
|---|---|---|---|---|---|
| Example 1 | 1.04 | 2.85 | 2.74 | 2.11 | 0.040 |
| Example 2 | 0.93 | 1.70 | 1.83 | 2.10 | 0.055 |
| Example 3 | 1.00 | 3.8 | 3.8 | 3.17 | 0.045 |
| Example 4 | 1.01 | 4.3 | 4.26 | 3.48 | 0.048 |
| Example 5 | 1.04 | 3.9 | 3.75 | 2.89 | 0.052 |
| Example 6 | 1.03 | 3.6 | 3.5 | 3.28 | 0.060 |
| Example 7 | 1.08 | 4.2 | 3.9 | 3.90 | 0.050 |
| Example 8 | 0.46 | 1.6 | 3.5 | 13.7 | 0.038 |
| Paper Cone | 0.50 | 1.5 | 3.0 | 10.0 | 0.030 |
| Aluminum | 2.7 | 70 | 25.9 | 3.0 | 0.005 |
| Polypropylene | 0.91 | 1.4 | 1.54 | 1.55 | 0.09 |
| Polyester | 1.38 | 2.2 | 1.59 | 0.70 | 0.01 |
| 4-methylpentene Polymer | 0.83 | 1.5 | 1.81 | 2.19 | 0.045 |

As hereinbefore fully described, the diaphragm for loudspeakers according to this invention is high in internal loss (the internal loss of paper is 0.030), low in density and high in modulus of elasticity. Because of this, not only can a flat frequency characteristic be obtained, but also it is high in efficiency over the wide range of reproduction frequency and excellent in water resistance and weathering resistance. In addition, the material of this invention has an advantage in that it can readily be thermally molded.

Although this invention has been described by way of the illustrative examples, it is to be noted that various changes and modifications are apparent to those skilled in the art. Such changes and modifications are to be understood as included within the scope of this invention unless they depart therefrom.

What is claimed is:

1. A diaphragm material for loudspeakers which comprises a mixture of:
    a base material composed of a mixture of 4-methylpentene polymer and polypropylene in a volume ratio of 0.5 to 2 parts by volume of 4-methylpentene polymer per part by volume of polypropylene, and
    a reinforcement composed of a mixture of mica and flaky graphite in a weight ratio of 0.1 to 0.3 part by weight of mica per part by weight of flaky graphite.

2. A diaphragm material as claimed in claim 1, wherein the base material and the reinforcement are compounded together by thermally molding them into a film by the use of an extruder.

3. A diaphragm material as claimed in claim 1, wherein the base material and the reinforcement are compounded together by molding a mixture of respective pulps of the base material and the reinforcement.

* * * * *